INVENTOR
HAROLD J. SMITH
BY *Marechal Biebel French Bugg*
ATTORNEYS

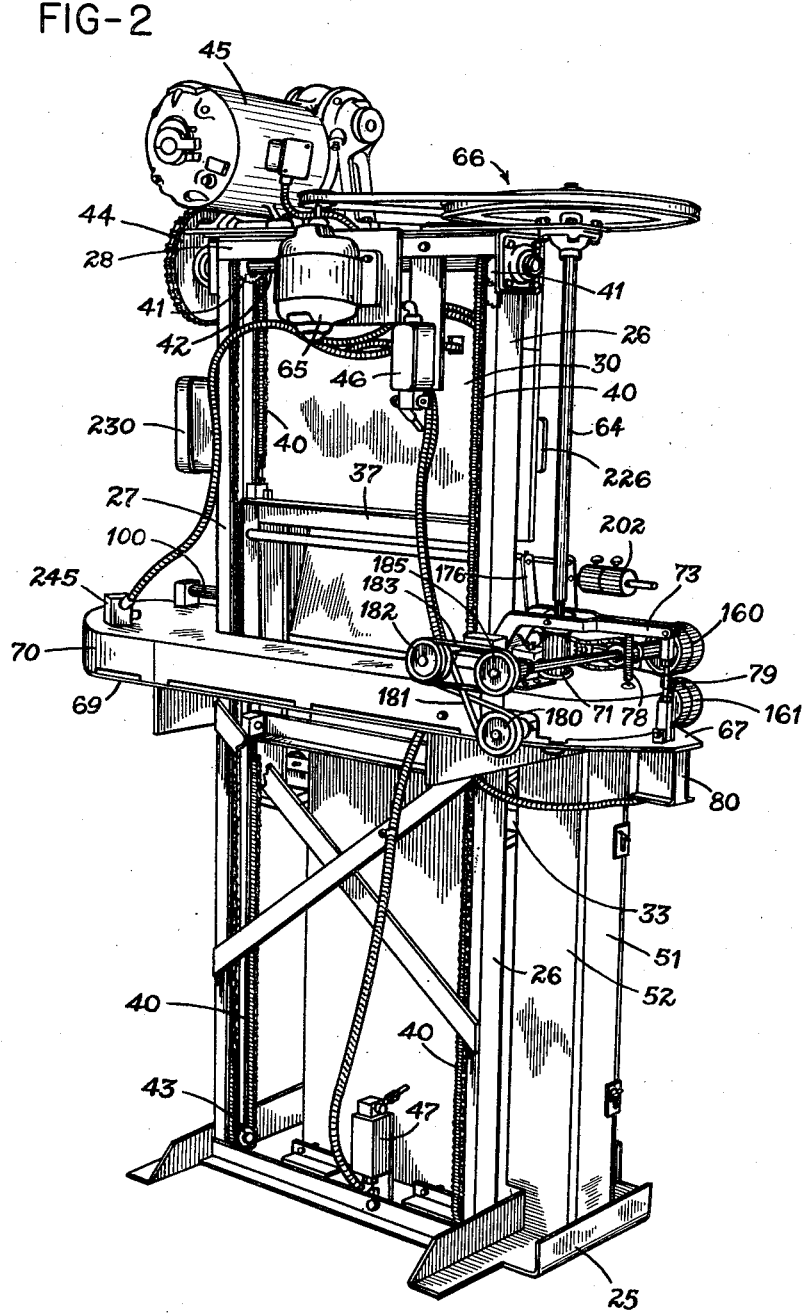

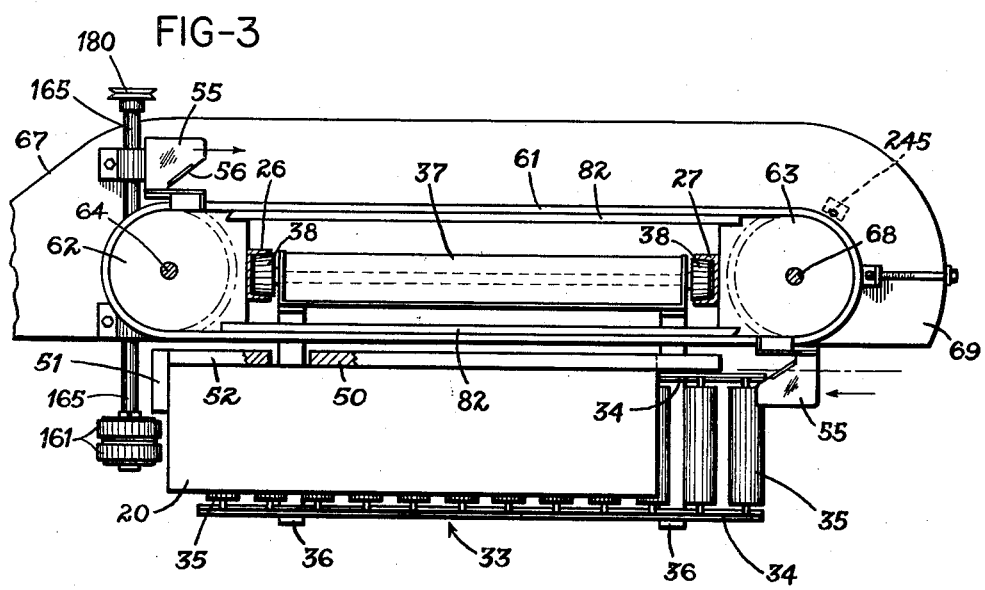
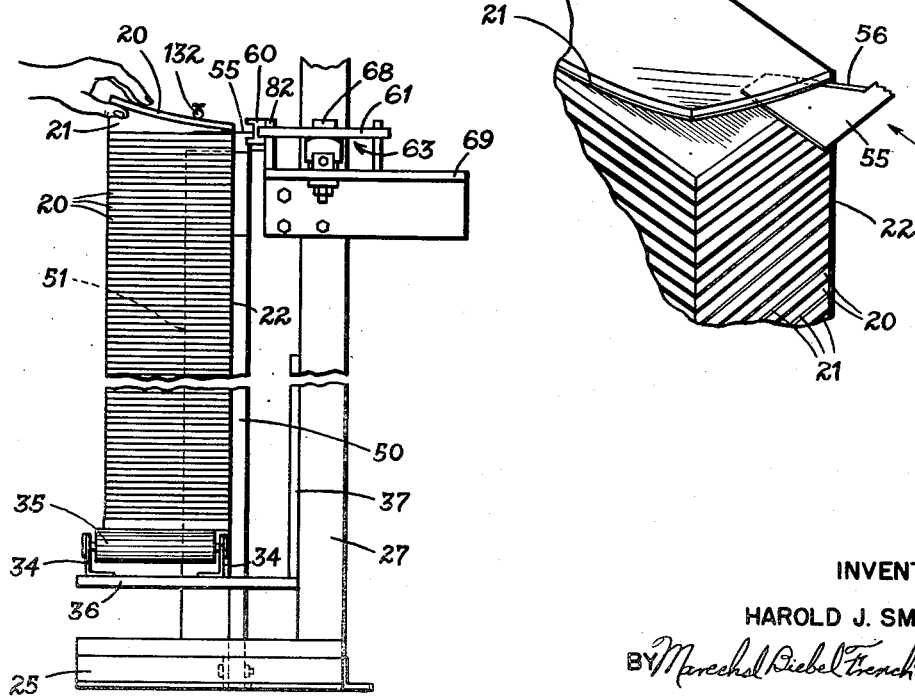

Aug. 3, 1954  H. J. SMITH  2,685,339
TABLET SLICING MACHINE
Filed Feb. 20, 1952  7 Sheets-Sheet 4

INVENTOR
HAROLD J. SMITH
BY Marechal Biebel French & Bugg
ATTORNEYS

Aug. 3, 1954      H. J. SMITH      2,685,339
TABLET SLICING MACHINE
Filed Feb. 20, 1952      7 Sheets-Sheet 5
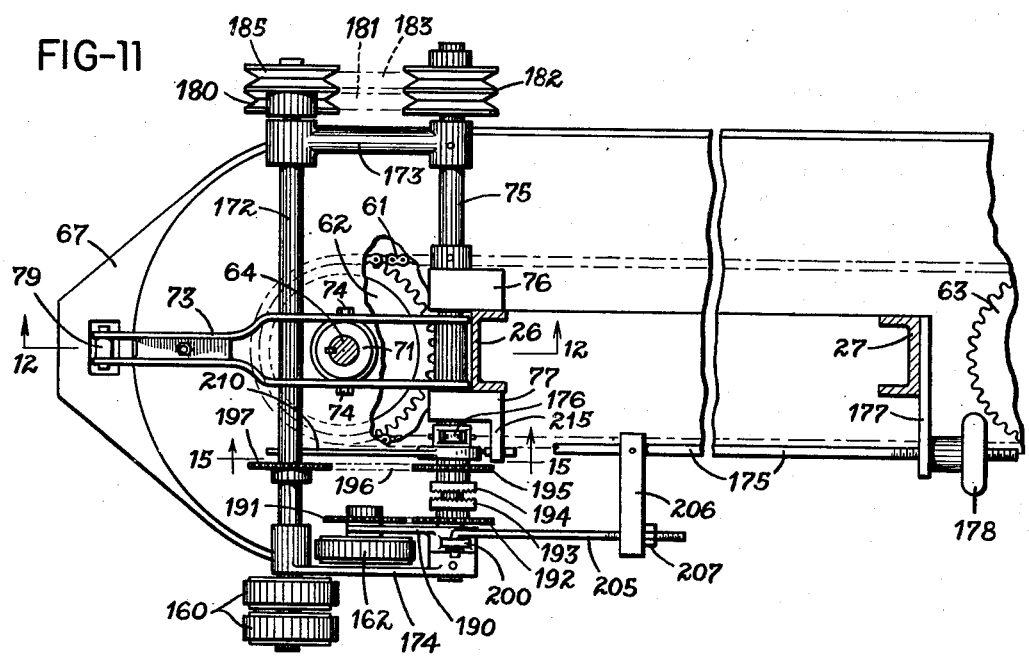
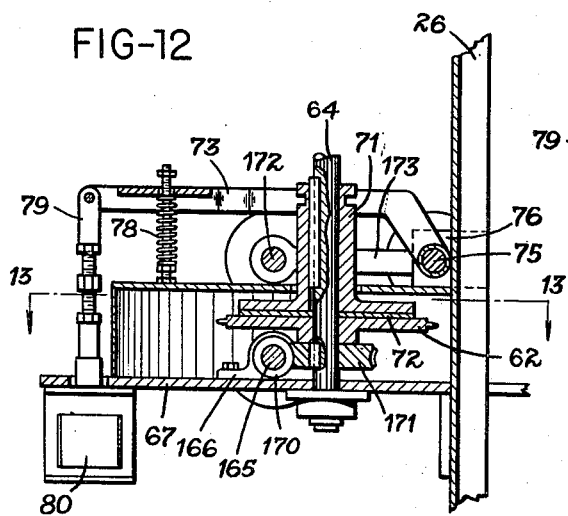
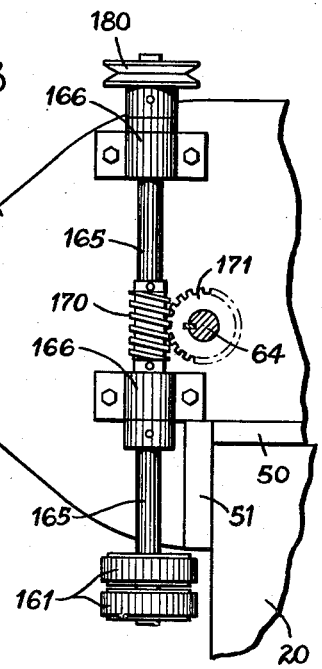
INVENTOR
HAROLD J. SMITH
BY *Marshall Biebel French & Bugg*
ATTORNEYS

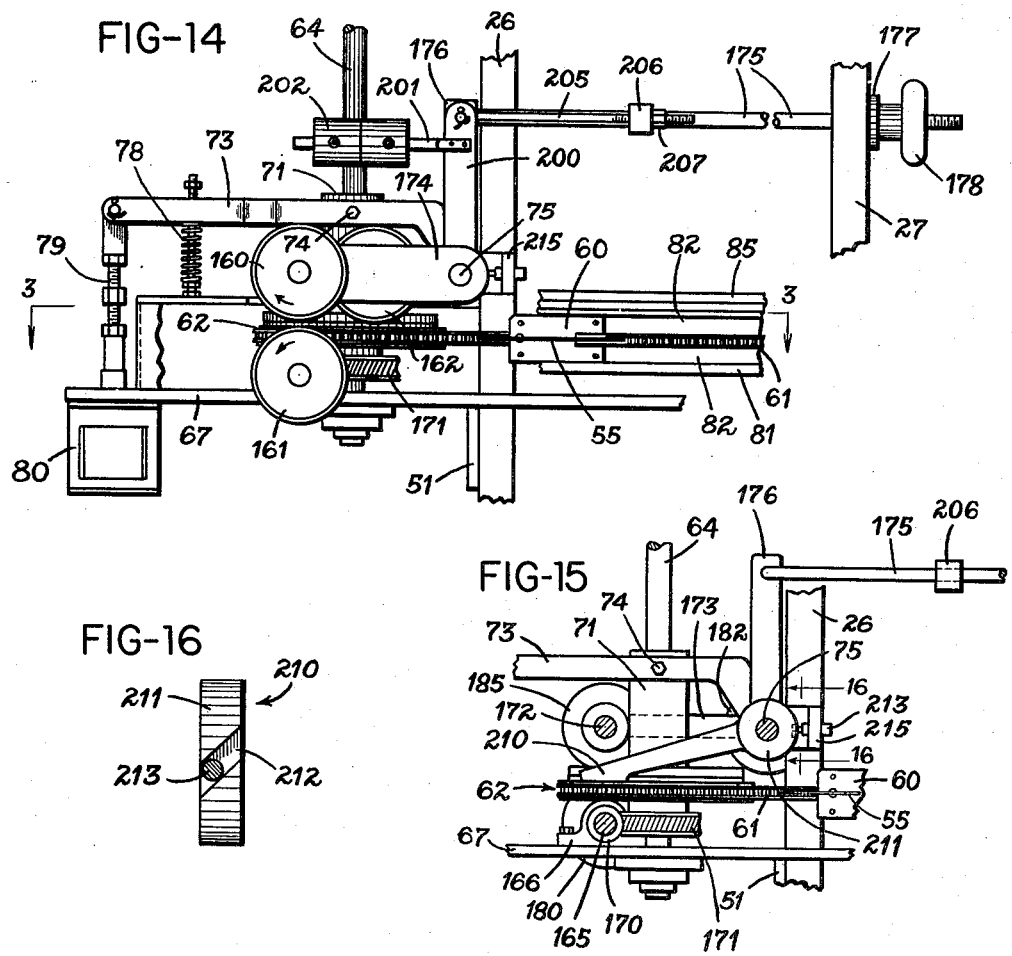

Aug. 3, 1954   H. J. SMITH   2,685,339
TABLET SLICING MACHINE
Filed Feb. 20, 1952   7 Sheets-Sheet 7

INVENTOR
HAROLD J. SMITH
BY *Marechal Biebel French & Bugg*
ATTORNEYS

Patented Aug. 3, 1954

2,685,339

UNITED STATES PATENT OFFICE 2,685,339

TABLET SLICING MACHINE

Harold J. Smith, St. Joseph, Mo., assignor to Western Tablet & Stationery Corporation, Dayton, Ohio, a corporation of Delaware Application February 20, 1952, Serial No. 272,558

15 Claims. (Cl. 164—73)

This invention relates to a machine for use in the production of paper tablets and the like.

In manufacturing paper tablets and like collected paper sheets, the sheets are commonly arranged in a stack, which may or may not include cardboard sheets for forming the backs of the finished tablets, and an adhering material or binding is applied across an entire face of the stack to secure the edges of the sheets together, usually also with the aid of a loose mesh fabric or other backing material. Under these conditions it will be evident that the adhesive backing extends continuously across the ends of all the sheets in the stack, and hence it is necessary to separate the individual tablets or groups of sheets one from another before completing the additional and final manufacturing steps, including the application of binding strips or the like in accordance with the particular type of tablet being produced.

It has been customary to separate the stack into the individual tablets by a manual slicing operation, but this presents certain hazards to the operator as well as being relatively expensive, and the present invention relates to a machine for separating or slicing the tablets from each other. In this connection, it is to be understood that the term "tablets" as used herein is not intended to be limited to the ordinary tablet as it reaches the average user, since such tablet has been cut and trimmed to size, and the term is intended to apply more broadly to groups of sheets, with or without a stiff cover or backing, and regardless of the size or length of the sheets, since it is customary to produce such tablets in units of substantial length which are then subsequently cut apart to form tablets of the proper size for commercial use. More generally, therefore, the invention relates to the handling of such groups of sheets in order to separate them from each other where they have been secured together by adhesive or other backing applied to the entire stack along one side face thereof.

It is the principal object of the present invention to provide a machine for receiving groups of sheets such as tablets arranged in a stack and adhered to each other along an edge, and for mechanically slicing the tablets apart to separate them into individual units ready for subsequent processing and completion of manufacture.

Another object is to provide such a machine in which the stack is received on a lift table with the topmost tablet located opposite a working station for slicing apart from the remainder of the stack, and in which after each successive tablet has been sliced from the stack, the lift table is automatically raised to locate the next successive tablet at the proper working height for slicing.

An additional object is to provide such a machine which can be readily adjusted for different sizes of tablets, and which will properly and accurately separate the topmost tablet regardless of the thickness of each individual tablet in the stack.

It is also an object of the invention to provide such a machine which is properly interlocked for the protection of the operator and to avoid damage to the stack of material by assuring that the slicing operation will not take place unless the stack is at the proper level and the operator is in a position of safety.

Still another object of the invention is to provide such a machine in which slicing of the tablets is effected by a floating knife arranged on a conveyor for travel through the edge of the stack and is guided into and through the stack in such manner as to assure that the slicing cut will occur at the proper level and also that the knife will accommodate to minor irregularities so as to give a clean and accurate cut without damage to any of the sheets.

Other objects and advantages of the invention will be apparent from the following description, the accompanying drawings and the appended claims.

In the drawings—

Fig. 2 is a perspective view of the back of the machine;

Fig. 3 is a plan view looking down on Fig. 4 and taken at approximately the level indicated by the line 3—3 of Fig. 14;

Fig. 4 is a fragmentary view looking from left to right in Fig. 3 and illustrating the operation of the machine;

Fig. 5 is a fragmentary perspective view further illustrating the operation of the machine;

Figure 7:
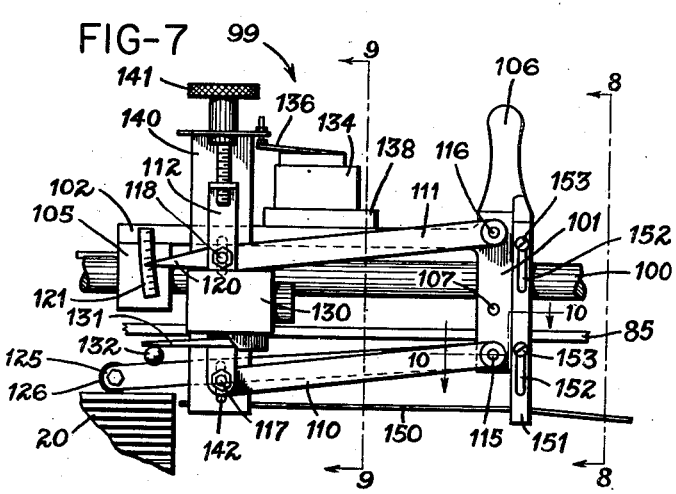
Fig. 7 is a fragmentary view in front elevation of the linkage mechanism for controlling the level of the work carried by the elevator.
Figure 8:
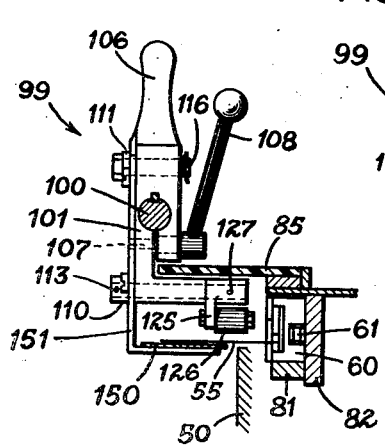
Figure 9:
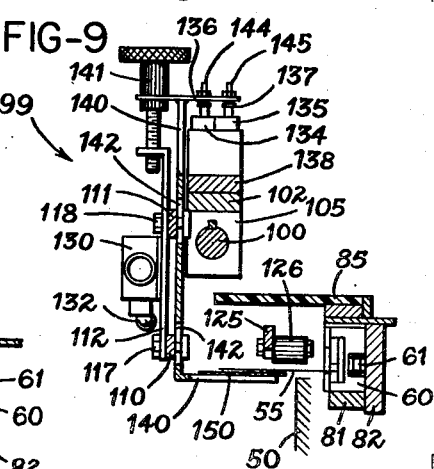
Figure 10:
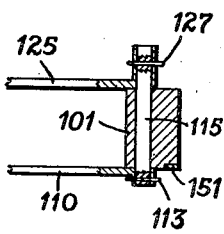
Figure 18:
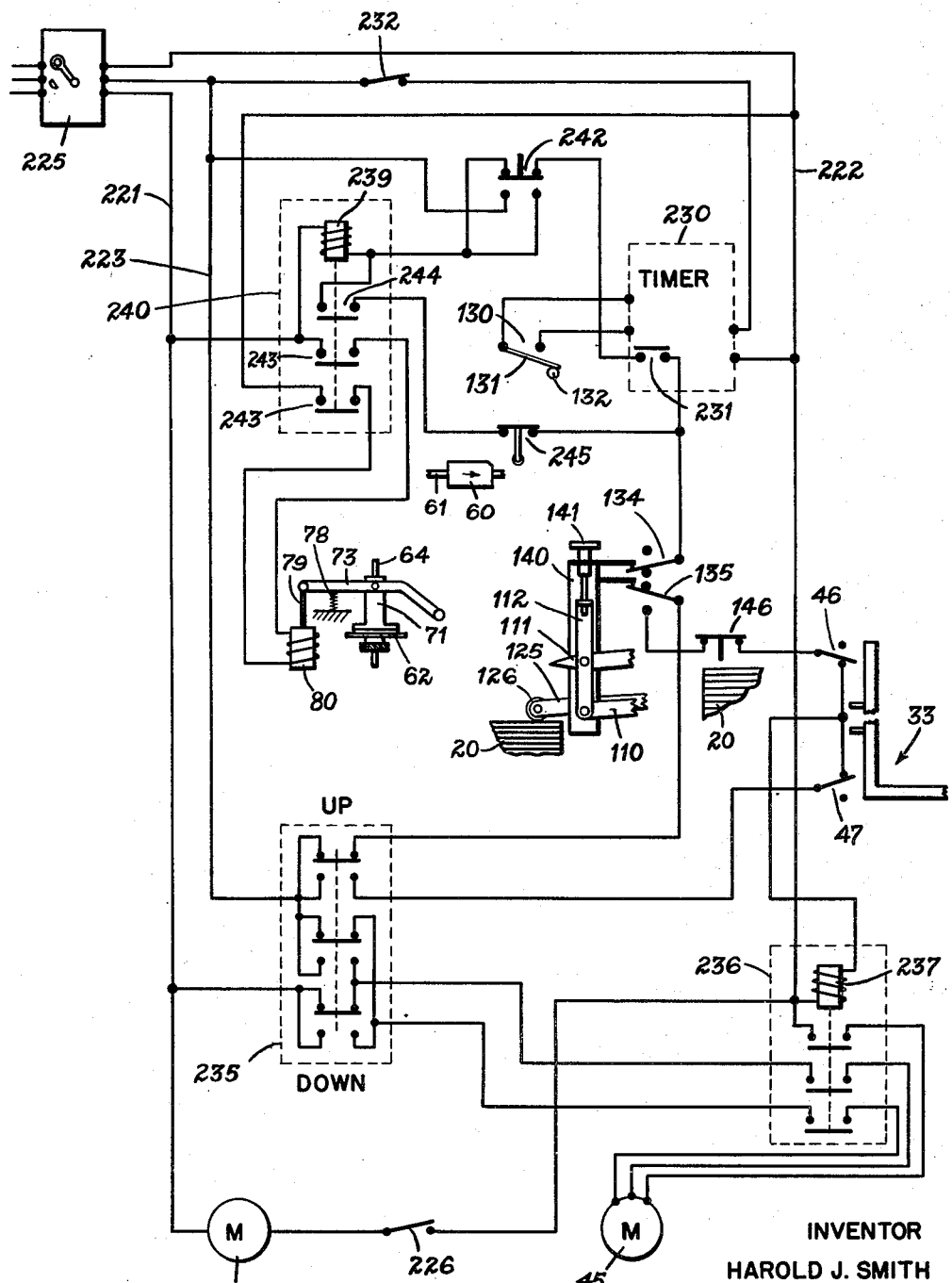

Figs. 8 and 9 are fragmentary sections on the lines 8—8 and 9—9 respectively of Fig. 7;

Fig. 10 is a fragmentary section on the line 10—10 of Fig. 7;

Fig. 11 is a fragmentary top view showing the mechanism for ejecting a sliced tablet from the machine;

Fig. 12 is a fragmentary section on the line 12—12 of Fig. 11;

Fig. 13 is a fragmentary section on the line 13—13 of Fig. 12;

Fig. 14 is a fragmentary view in front elevation of the parts shown in Figs. 11 and 12;

Fig. 15 is a fragmentary section approximately on the line 15—15 of Fig. 11;

Fig. 16 is an enlarged detail view showing the cam slot on the clutch lever for the primary ejector wheel, the view being generally in section on the line 16—16 of Fig. 15;

Fig. 17 is a somewhat diagrammatic view illustrating the operation of the ejecting mechanism; and Fig. 18 is a wiring diagram.

Referring to the drawings, which illustrate a preferred embodiment of the invention, Figs. 3–5 illustrate in somewhat diagrammatic detail the slicing operation which the machine of the invention is particularly designed to perform. A stack of tablets is shown as consisting of multiple layers of paper 20 interleaved with the cardboard layers 21 which form the supporting backs of the finished tablets, and these multiple stacked layers are held together by an adhesive binding 22 which must be sliced apart adjacent one surface of each cardboard layer 21 in order to separate the stack into the desired individual tablets. The machine of the invention is designed to perform this slicing operation quickly and accurately between each successive tablet in the stack with maximum assurance of the personal safety of the operator and also with maximum assurance against slicing the stack at an improper location other than directly adjacent the cardboard layer. In addition, this machine is designed to operate in this desired manner on tablets of many different sizes, it being apparent, for example, that each of the individual tablet layers as shown in Figs. 3–5 is of such length that it could be subsequently further cut into multiple single tablets.

Referring first to Figs. 1–4, the main frame of the machine includes a base 25 and a pair of channels 26 and 27 which are connected by a top beam 28 and other suitable cross-braces and which support an upper front panel 30 carrying the several control switches. The elevator or hoist 33 which carries the stack of tablets to be cut includes a frame 34 supporting a plurality of rollers 35 to form a lift table for receiving the stack. The frame 34 is in turn carried by a pair of arms 36 extending forward from a carriage 37 supported for vertical movement by a plurality of rollers 38 received within tracks formed by the channels 26 and 27.

The vertical movement of the elevator 33 is effected by means of sprocket chains 40 which are secured to the carriage 37 as shown in Fig. 2 and run over sprockets 41 on a shaft 42 at the upper end of the frame and guide sprockets 43 at the lower end of the frame. The shaft 42 carries a sprocket 44 which is driven by a motor 45 mounted on the top of the frame and shown as of the gear head type to provide a desired low operating speed. Upper and lower limit switches 46 and 47 are also mounted at the back of the machine for engagement by the elevator carriage to limit its movement in each direction, and suitable controls are provided as described hereinafter for intermittently actuating the elevator motor 45 to raise the elevator 33 in successive stages to position the top of the stack at the proper level for operation thereon by the cutting mechanism of the machine. Guiding for the stack during travel and cutting is provided by the lower front panel 50 on the frame cooperating with a pair of corner panels 51 and 52 also secured to the main frame.

The machine is provided with a pair of traveling knife units each including a knife 55 of generally triangular shape to position its cutting edge 56 at approximately 45° to the adhesive backing 22 during the slicing operation. Each knife 55 is carried by a block 60 secured in equispaced relation to a sprocket chain 61 running around a pair of sprockets 62 and 63 at opposite sides of the machine. The sprocket 62 is on a vertical shaft 64 driven by a motor 65 mounted at the back of the machine on the top beam 28, the drive connection being shown as comprising a belt and pulleys indicated generally at 66 on the upper end of shaft 64, and the lower end of shaft 64 being journaled in a shelf portion 67 of the main frame. The sprocket 63 is an idler on a shaft 68 mounted on an extension 69 of the frame portion and normally enclosed by the housing 70.

The driving connection between sprocket 62 and shaft 64 is formed by a clutch member 71 having a friction facing 72 adapted to engage the upper surface of sprocket 62, the clutch member 71 being keyed for axial movement on shaft 64. Movement of clutch 71 into and out of engagement with sprocket 62 is effected by means of a yoke-shaped lever 73 connected with the clutch by bolts 74 and pivoted on a shaft 75 carried by blocks 76 and 77 which are secured on opposite sides of the channel 26. Lever 73 is normally held up in the disengaged position of the clutch by spring 78 (Fig. 12), and it is moved into engaged position by its connection 79 with a solenoid 80 mounted on the underside of the shelf 67.

In the operation of these parts, and referring particularly to Fig. 3, when the sprocket chain 61 moves, it carries the knives 55 successively through a path defining a working station or plane above the lift table, and the parts are so proportioned that during this travel of each knife, its blade will slice through the adhesive backing 22 of a stack of tablets located in guided contact with the front panel 50. During this operating movement, the knife block 60 is guided by a guide bar 81 (Figs. 8 and 9) secured to a bar 82 extending across the main frame of the machine and also serving as a guard for the sprocket chain 61. Additional protection for the knife and its associated parts is provided by a plate 85 also mounted on the bar 82 as shown in Figs. 8 and 9 and extending above the path of the knife, this plate being conveniently formed of glass on a transparent plastic material to permit the operator to watch the travel of the knife therethrough.

Figure 6:
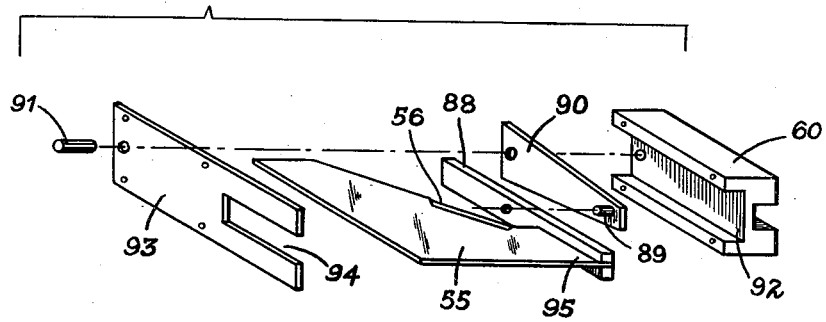
Fig. 6 is an exploded perspective view showing one of the knife units of the machine, including the parts for mounting the knife.

Each knife 55 is provided with a floating connection to its supporting block 60 in order to enable the blade to adapt itself to irregularities in the stack and thus effectively to feel its way through the stack during the slicing operation. Referring to Fig. 6, the blade is carried by a bar 88 pivoted on a pin 89 carried by an arm 90 which is in turn pivoted on a pin 91 to the block 60. The block is formed with a channel portion 92 which receives both the bar 88 and arm 90 and is closed by a cover 93 slotted at 94 to permit passage therethrough of the extension portion 95 of the knife secured to the bar 88. The arm 90 can thus pivot with channel 92, and also the bar 88 can similarly pivot within this channel, the sides of the channel serving to limit this movement of the parts 88 and 90 and cooperating therewith to provide the desired limited floating movement for the knife.

In the operation of this machine, after each knife has completed its stroke to slice the tablet at the top of the stack, the sliced tablet is ejected, and the elevator motor 45 is actuated to raise the stack into position for the next slicing stroke. This movement of the elevator is effected and regulated by a linkage and feeler mechanism which also carries and operates certain of the control switches of the machine and includes means for assuring that the work is in proper position on the elevator before the cutting cycle of the machine is permitted to start. This control mechanism is indicated generally at 99 in Fig. 1 and is shown in detail in Figs. 7–9.

The linkage and control mechanism 99 is carried by a rod 100 extending across the front of the machine and is adjustable laterally on this rod in accordance with the size of the stack of tablets to be cut. The main supporting part for the mechanism 99 is a block 101 which is slotted to form a clamp keyed to rod 100 for sliding movement and connected by a bar 102 with a second block 105 similarly keyed on rod 100. The block 101 is formed with a handle portion 106 at its upper end to facilitate manual sliding of the block along rod 100, and it is also provided with a clamping screw 107 having a handle 108 to clamp it in adjusted position on rod 100.

The block 101 supports the fixed pivots for a pair of links 110 and 111 cooperating with the block 101 and a strap 112 to form a parallelogram linkage. The lower link 110 includes a boss portion at one end secured by a pin 113 to the outer end of a shaft 115 journaled in the lower end of the block 101, and the corresponding end of upper link 111 is similarly pivoted by a shaft 116 to the upper portion of block 101. The opposite ends of links 110 and 111 are pivoted to the strap 112 by bolts 117 and 118 respectively, and the movable end of link 111 is sharpened to form a pointer 120 for cooperation with a scale 121 carried by the bar 102 and block 105, and this scale and pointer aid in adjusting the linkage to adapt the machine for operation with tablets of different thickness. Movement of the linkage in coordinated relation with the stack of tablets on the elevator is effected by a feeler arm 125 having a roller 126 at one end adapted to rest on the top of the stack and secured at its other end to the shaft 115 by the pin 127 (Fig. 10) so that the feeler arm 125 acts as a crank to move the entire linkage 110—112 up and down.

The strap 112 carries a microswitch 130 which acts as the initiating switch for the operating cycle of the machine as described hereinafter. The switch arm 131 is extended outwardly above the stack and is shown as carrying a small ball 132 which is adapted to be contacted by the edge of the top tablet to be sliced in initiating the operating cycle. Figs. 7 and 9 also show twin microswitches 134 and 135 which are connected in the control circuits of the machine to provide for operation of the knives only when the stack on the elevator is at the proper level for the slicing operation, these switches having switch arms 136 and 137 respectively and being mounted on a base plate 138 on the bar 102.

The operating mechanism for the switches 134 and 135 includes a bracket 140, which is generally J-shaped in outline, mounted on the strap 112 for movement therewith, the mounting connection between these parts being formed by an adjusting screw 141, and the bracket 140 being slotted at 142 to receive the bolts 117 and 118. The upper end of bracket 140 carries operating bolts 144 and 145 for the switch arms 136 and 137 respectively, so that the switches 134 and 135 are thus operated in accordance with the up and down movement of bracket 140 with the parallelogram linkage, and bolts 144 and 145 are individually adjustable in bracket 140 to provide for operating these switches in desired sequential relation as the bracket moves. Since movement of the linkage is caused by movement of the stack through its contact with the feeler arm 125, it will be seen that operation of switches 144 and 145 will be caused directly by the movement of the stack. In order to prevent possible failure of these switches to operate as a result of the stack being out of proper position for engagement with arm 125, a normally closed auxiliary switch 146 is mounted adjacent the opposite end of the machine from the control mechanism 99 and serves as an upper limit switch for engagement by the stack.

The lower end of bracket 140 supports one end of a flexible plate 150 which forms the lower guide for the knife 55 as it approaches and enters the stack, the opposite end of this guide being supported by a bracket 151 mounted on the block 101 by means of slots 152 and screws 153. In the initial adjustment of the parts in accordance with the thickness of the tablets to be sliced, the adjusting screw 141 is so set that when the feeler roller 126 is resting on the top of the stack, the upper surface of the guide 150 will be substantially directly in line with the bottom surface of the topmost group of sheets, that is in the case of a tablet at the bottom of the cardboard layer 21 in the uppermost tablet and thus defines the proper operating plane for the knife. In order to guide the knife properly, the portion of the guide plate 150 at the entering end with respect to the knife is inclined downwardly, as shown to the right of the part 151 in Fig. 7, to engage and guide the knife into the proper plane before it reaches the work. The bracket 151 which supports the entering end of guide plate 150 normally rests by gravity in its lowest position provided by slots 152 or screws 153, but if inadvertently the mechanism 99 is not adjusted properly for a longer stack of tablets so that the stack is brought up under this mechanism instead of merely under the roller 126 and the ball 132, the slots 152 provide for sufficient upward travel of plate 150 to allow the limit switches to operate before damage of the machine occurs.

The mechanism for ejecting successive tablets as they are cut from the top of the stack is shown in detail in Figs. 11–17, and it includes a pair of secondary ejector wheels 160 and 161, shown as each comprising a pair of coaxial wheels, and a primary ejector wheel 162 which operates to project the cut tablet into the nip of the secondary ejector wheels. The lower secondary ejector wheel 161 is secured to a shaft 165 mounted in bearing blocks 166 on the main supporting plate portion 67 of the frame, and shaft 165 carries a worm 170 meshing with a worm gear 171 keyed to continuously driven shaft 64. The upper secondary ejector wheel 160 is secured to a shaft 172 which is carried by arms 173 and 174 pinned to the shaft 75. The shaft 75 may accordingly be rocked to change the relative spacing of the ejector wheels 160 and 161, and this adjusting movement is regulated by a rod 175 connected at one end to an upwardly extending arm 176 pinned on shaft 75, the other end of rod 175 extending through a bracket 177 on channel 27 and being threaded to receive an adjusting nut 178. The drive for shaft 172 is transmitted from pulley 180 on shaft 165 through a belt 181 to a double pulley 182 on shaft 75 from which in turn a belt 183 runs to a pulley 185 on shaft 173. As shown in Fig. 2, the belt 181 is turned over to cause the desired rotation of wheels 160 and 161 in opposite directions.

The primary ejector wheel 162 is carried by an arm 190 pivoted on shaft 75, and wheel 162 is directly connected with a sprocket wheel 191 connected by a sprocket chain with a similar sprocket 192 carried by one of the pair of jaw clutch members 193 and 194 on shaft 75. The other clutch member 194 similarly carries a sprocket 195 connected by a chain 196 with a sprocket 197 on shaft 172, so that when the clutch members 193 and 194 are in engagement, there will be a drive from shaft 172 to ejector wheel 162 through this clutch and the two pairs of sprockets and their associated chains.

The hub portion of arm 190 also carries an upwardly extending arm 200 from which a rod 201 extends above arm 190 and carries counterweights 202 which thus act through arm 200 to urge arm 190 and ejector wheel 162 downwardly towards the stack on the elevator. Adjustment of this assembly to locate ejector wheel 162 in properly contacting relation with the stack is regulated by a rod 205 connected at one end to the arm 200 and having its other end passing through a block 206 pinned on the rod 175, this end of rod 205 being threaded to receive an adjusting nut 207. It will thus be seen that arm 190 and ejector wheel 162 will be adjusted simultaneously with the upper secondary ejector wheel 160 through the rod 175 and adjusting nut 178 as previously described.

In the normal position of the machine, the primary ejector wheel 162 rests on the tablet at the top of the stack which is being sliced, but wheel 162 remains stationary as a result of disengagement of the clutch 193—194. Engagement of this clutch is effected in timed relation with the stroke of the knife by an arm 210 pivoted on shaft 75 and extending downwardly at an angle into the path of the knife block 60. The pivoted end of arm 210 includes a collar 211 adjacent clutch member 194 which is formed with a cam slot 212 (Fig. 16) cooperating with a pin 213 carried by an extension 215 on the block 77, the cam slot 212 being so inclined that when arm 210 is lifted, the cooperative action of the cam slot with the pin 213 will cause the arm to move axially and thus shift clutch member 194 into engagement with clutch member 193 and transmit the desired drive to the primary ejector wheel 162. Since this action takes place just as the knife block completes the cutting stroke of the knife, ejector wheel 162 will immediately begin to rotate, and since it is held in frictional engagement with the sliced tablet by the operation of the counterweights 202, it will slide this tablet forward into the nip of the continuously rotating secondary ejector wheels for removal thereby from the machine in preparation for slicing the next tablet in the stack, as shown diagrammatically in Fig. 17.

Figure 1:
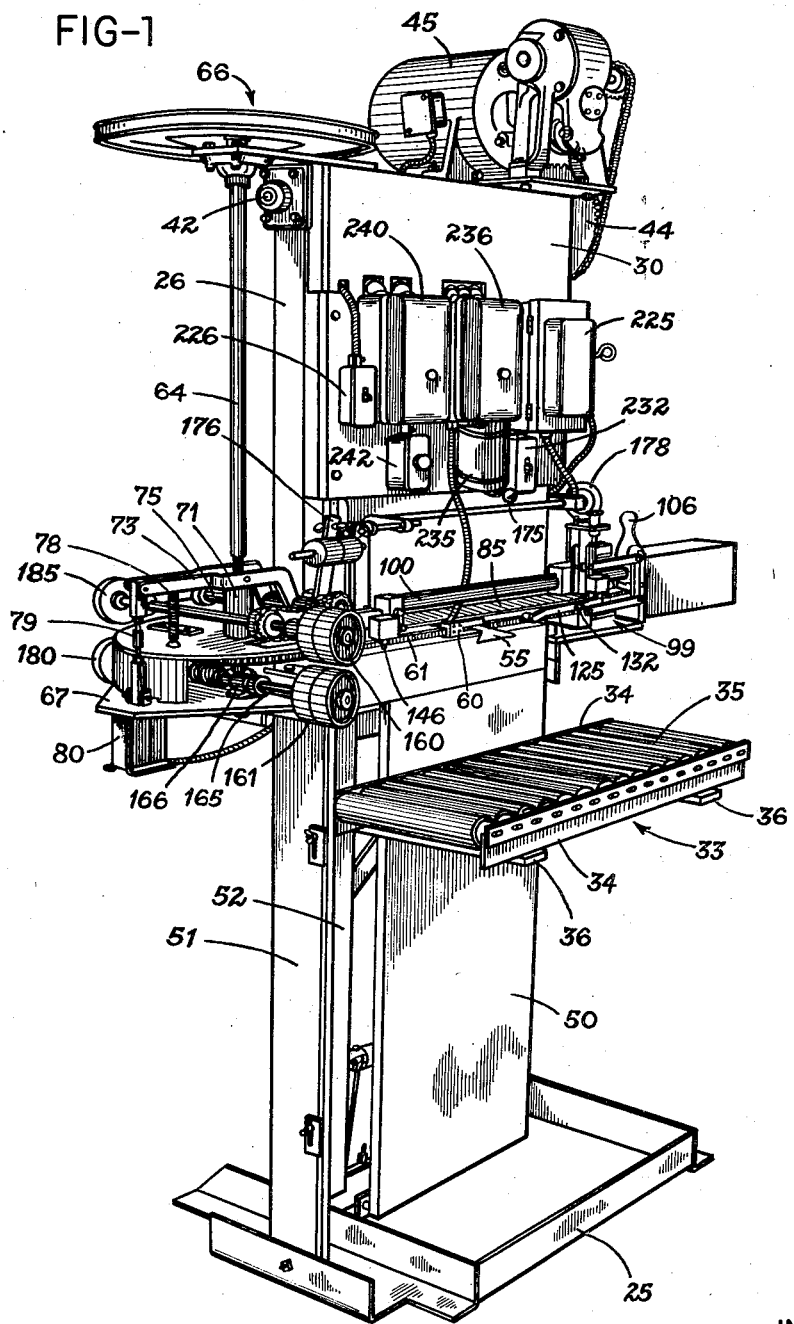
Fig. 1 is a perspective view of the front or working side of a tablet slicing machine constructed in accordance with the invention.

The sequence of operation of the machine is illustrated schematically by the wiring diagram of Fig. 18, in which the main power lines are identified as 221, 222 and 223 respectively and are controlled by a safety disconnect switch 225 mounted on the switch panel 30 as shown in Fig. 1. The line 222 supplies single phase power through a manual switch 226 for operation of the drive motor 65 for the traveling knives and ejector wheels, the other side of the motor being grounded. The timer 230 shown in Fig. 18 is of a type operable to provide a temporary maintained closed interval for the contacts of the switch 231 therewithin, satisfactory results having been obtained employing a General Electric Electronic Timer, type CR 7504 connected for "EDE" operation. The timer 230 is connected as shown between lines 222 and 223 and is provided with a manual control switch 232. The switch 235 is a manually operated reversing switch for controlling the phase relationship of lines 231 and 233 to the magnetic starting switch 236 for the three phase elevator motor 45 in order to determine whether the elevator moves up or down upon starting of motor 45 when switch 236 is closed by actuation of its operating coil 237.

Fig. 18 shows the positions of the several switches ready for the start of the work cycle, with reversing switch 235 in its "up" position and with the elevator assumed to be in the correct position to locate the uppermost tablet in the stack at the proper level for slicing. The work cycle is initiated by the manual act of the operator in lifting the front right hand corner of the tablet as shown in Fig. 4 until the end edge of the tablet engages the ball 132 and moves the switch arm 131 to the closed position of switch 130. Closing switch 130 completes the actuating circuit for the timer 230 which closes its switch 231. This completes the actuating circuit for the operating coil 239 of magnetic starter switch 240, this circuit running from line 221 through the switch coil 239, the closed side of knife inching switch 242, the timer switch 231, the twin microswitches 134 and 135, and then through the upper contacts of switch 235 to line 223. Starter switch 240 includes switch contacts 243 completing the actuating circuit for the magnetic coil of clutch solenoid 80, thus causing the sprocket 62 to begin to rotate with resulting travel of one of the knives 55 through the edge of the stack as shown in Fig. 5.

The starter switch 240 also includes contacts 244 which complete a holding circuit for coil 239 through the normally closed knife stop switch 245, which is mounted at the back of the machine in the path of the knife blocks 60 as shown in Figs. 2 and 3. Thus while the switch 231 remains closed only for the timed interval provided by timer 230, which interval is required to permit the knife block 60 to move beyond switch 245 and permit it to reclose, switch 240 remains actuated until the knife has completed its cutting stroke, at which time the supporting block 60 for the other knife engages and opens stop switch 245, which stops the machine. The timer however will not reclose its contacts 231 until after the circuit through switch 130 has been broken and reclosed and hence even if switch 130 remains in closed position, it is not possible for a second stroke of the knife to occur until the entire cycle is finished and a new tablet has been brought into proper position. As previously noted, just before completion of its full stroke of the knife, and after it has passed through the stack, the supporting block 60 for the knife at the front of the machine engages and raises the lever 210 to operate clutch 193—194 and cause primary ejector wheel 162 to rotate and thus to advance the severed tablet into the nip of the secondary ejector wheels for ejection from the machine.

Approximately simultaneously with the opening of switch 240, ejection of the severed tablet will cause the arm 125 to drop to the level of the next tablet in the stack, and the resulting downward movement of the bracket 140 will close microswitch 135. This completes an actuating circuit for the operating coil 237 of elevator starter switch 236, this circuit running from line 223 through microswitch 135, auxiliary switch 146, upper limit switch 46 and coil 237 to line 222. The elevator motor therefore starts and raises the stack until arm 125 has been raised sufficiently to open microswitch 135, whereupon the actuating circuit for coil 237 is broken and switch 236 opens.

The adjustment of the operating bolts 144 and 145 is important in assuring correct positioning of the stack for each cutting stroke, since it is necessary for proper operation of the knife that switch 135 be open while switch 134 remains closed in order to complete the circuit through their two switch arms 136 and 137. Thus if the stack should rise so high as to raise arm 125 sufficiently to permit switch 134 to open, it would be impossible to complete the actuating circuit for coil 239 of starter switch 240. This arrangement of the switches therefore provides for fine control, by relative adjustment of the bolts 144 and 145, so that the elevator is stopped as soon as bolt 145 has reached a sufficient height to permit switch 135 to open and while bolt 144 is still below the level at which it permits opening of switch 134.

After the elevator has been operated as described to raise the stack to the proper level for the next slicing operation, the above cycle is again initiated by the operator as before by manually raising one corner of the tablet to be sliced. In this connection the interlock of the several switches for maximum safety should be particularly noted. As noted, the knife will not operate at all if the stack is at any height other than the proper height as determined by the conjoint operation of switches 134 and 135. Also, even if the switch 130 should be held closed, the machine will not repeat its cycle, since with the timer 230 of the indicated type, it will not repeat until switch 130 is opened and reclosed, and thus starter switch 240 will remain open after its coil 239 is deenergized by the opening of switch 245.

The machine will continue to operate as described above, with the elevator being actuated intermittently after each tablet is sliced and ejected, until the entire stack has been sliced. The operator then manually reverses switch 235 to its "Down" position, thus completing the actuating circuit for the coil 237 of elevator switch 236 through the lower limit switch 47, and the elevator accordingly moves downwardly until it engages and opens switch 47. Then after a new stack has been loaded on the elevator, return of reversing switch 235 to its "Up" position, will cause the operating cycle of the machine to begin again as already described. Since ordinarily the stack will be below the proper working level when first loaded on the elevator, the feeler arm 125 will be in position to close switch 135, and thus the first operation will be actuation of the elevator motor to raise the stack to the proper level. Thereafter the successive slicing operations will be started as described by the manual act of the operator in raising the corner of the tablet.

It will accordingly be seen that the present invention provides an automatic machine for slicing successive tablets or other groups from a stack adhered together along one side, and that this operation will be reliable and also will assure maximum safety for the operator. The machine is readily adjustable for tablets of different widths, by movement of the mechanism 99 on rod 100, and also for groups of sheets of different thickness, through relative adjustment of the feeler arm 125 and bracket 140 by means of the adjusting screw 141. In addition, the arrangement and interlocking relation of the several switches as described assures that the knife will not operate except when the uppermost tablet in the stack is at the proper working level, and also since the knife is initially started by the manual act of the operator in raising the corner of the tablet against the starting switch, adequate assurance is given against accidental movement of the knife when the operator is not in a position of safety.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine for slicing groups of sheets from the top of a stack thereof adhered to each other along one edge comprising a movable support for receiving said stack, control means for maintaining the top of said stack at a predetermined level as each said group is removed from the top thereof, means movable lengthwise of said adhering edge in a continuous path for slicing through said adhering edge between the top group in said stack and the remainder thereof to separate said top group in the stack from the remainder thereof, and means responsive to completion of the slicing movement of said slicing means for thereafter delivering the separated group from the top of the stack.

2. Apparatus for slicing successive groups of sheets from a stack thereof secured together by a binding along one side face of said stack, comprising a frame, a knife supported on said frame for travel lengthwise of said binding in a continuous path in a predetermined plane, an elevator on said frame for supporting said stack, an intermittently operable drive for said elevator to raise the uppermost said group in said stack into said plane for slicing from said stack by said knife, means responsive to completion of the slicing movement of said knife for removing said uppermost group from said stack following slicing thereof, and means responsive to removal of said sliced group for actuating said drive.

3. Apparatus for slicing successive groups of sheets from a stack thereof secured together by a binding along one side face of said stack, comprising a frame, a knife supported on said frame for travel in a predetermined plane, an elevator on said frame for supporting said stack, an intermittently actuated drive for said elevator to raise the uppermost group in said stack into said plane for slicing from said stack by said knife, a pair of continuously driven ejector rolls located in laterally spaced relation with said stack for ejecting sliced groups from said machine, an auxiliary and normally non-rotating roll adapted to engage said uppermost group in said stack, and means responsive to completion of the slicing of said uppermost group for causing rotation of said auxiliary roll to project the resulting sliced group into the nip of said continuously rotating rolls for ejection thereby from said machine.

4. Apparatus for slicing successive tablets from a stack thereof secured together by a binding along one side face of said stack, comprising a frame, a knife supported on said frame for travel lengthwise of said binding in a continuous path in a predetermined plane defining a working station, an elevator on said frame for supporting said stack, an intermittently actuated drive for said elevator to raise the uppermost tablet in said stack into said plane for slicing from said stack by said knife, means actuated by said knife upon completion of the slicing movement thereof for removing each successive sliced tablet from said machine, and means responsive to removal of said slicing tablet for actuating said elevator drive to raise said stack into proper relation with said working station for slicing the next tablet therefrom.

5. A machine for separating groups of sheets which are adhered to each other along an edge thereof, comprising a lift table adapted to receive groups of said sheets in a stack, means for sensing the level of the top of said stack, means for actuating said lift table to maintain the top of said stack at a predetermined level following removal of each group of sheets therefrom, a slicing knife, a control adjacent the top of said stack and above said lever in position to be actuated in response to the raising of the outer portion of the topmost group of sheets, a drive responsive to actuation of said control to cause said knife to perform a slicing stroke along said edge of the stack to separate the topmost group of sheets therefrom, and means responsive to completion of said slicing stroke for removing the separated top group of sheets from the stack.

6. A machine for separating groups of sheets which are adhered to each other along an edge thereof, comprising a lift table adapted to receive groups of said sheets in a stack, means for sensing the level of the top of said stack, means for actuating said lift table to maintain the top of said stack at a predetermined level following removal of each group of sheets therefrom, a slicing knife, a manual control adjacent the top of said stack and above said lever in position to be engaged and actuated by the raised outer corner of the topmost group of sheets, a drive responsive to actuation of said control to cause said knife to perform a slicing stroke along said edge of the stack to separate the topmost group of sheets therefrom, and means responsive to completion of said slicing stroke for removing the separated top group of sheets from the stack.

7. A machine for separating groups of sheets which are adhered to each other along an edge thereof, comprising a lift table adapted to receive groups of said sheets in a stack, means for sensing the level of the top of said stack, means for actuating said lift table to maintain the top of said stack at a predetermined level following removal of each group of sheets therefrom, a plurality of traveling slicing knives, an endless conveyor arranged to carry said knives in a continuous horizontal path below said level, means operable when the top of said stack is at said predetermined level for causing said knife to perform a working stroke along said edge of the stack by intermittent movement of said conveyor to carry one of said knives through said adhering edge, and means to terminate said knife movement when one said knife has completed its said working stroke leaving said conveyor stationary during removal of the separated group of sheets and subsequent adjustment of the level of said stack.

8. A machine for separating groups of sheets which are adhered along an edge thereof and arranged in a stack which comprises a lift table adapted to receive said groups of sheets in a stack, means for sensing the level of the top of said stack, means for actuating said lift table under control of said sensing means to maintain the top of said stack at a predetermined level as each group of sheets is removed, an intermittently moving slicing knife, means for actuating said slicing knife for a stroke of movement to slice along said edge of the stack to separate the topmost group of sheets therefrom in a working stroke of movement, means for engaging the topmost group of sheets on the stack to effect removal thereof from the stack, and means for operating said removing means responsive to completion of said stroke of movement of said knife intermittently in correlated relation with the working stroke of movement of said knife.

9. Apparatus for slicing successive groups of sheets from a stack thereof secured together by a binding along one side face of said stack, comprising a frame, a knife supported on said frame for travel in a continuous path in a predetermined plane, an elevator on said frame for supporting said stack, an intermittently actuated drive for said elevator to raise the uppermost group in said stack into said plane for slicing from said stack by said knife, means responsive to completion of the slicing stroke of said knife for stopping further movement of said knife, means actuated by the operator for restarting said knife for the next cutting cycle thereof, and means interlocked with said restarting means for preventing restarting of said knife if said stack is not in proper working relation with said working station.

10. A machine for separating groups of sheets which are adhered along an edge thereof and arranged in a stack which comprises a lift table adapted to receive said groups of sheets in a stack, means for sensing the level of the top of said stack, means for actuating said lift table under control of said sensing means to maintain the top of said stack at a predetermined level as each group of sheets is removed, an intermittently moving slicing knife, means for actuating said slicing knife for a stroke of movement to slice along said edge of the stack to separate the topmost group of sheets therefrom in a working stroke of movement, intermittently operable delivery means for engaging the topmost group of sheets on the stack to effect removal thereof from the stack, means for initiating the operation of said delivery means at the completion of the working stroke of movement of said knife, and additional continuously operating delivery means for receiving said separated group from said removing means and completing the delivery thereof from said stack.

11. In a machine for separating groups of sheets arranged in a stack and adhered along an edge which comprises means for supporting said stack in predetermined position, a traveling slicing knife movable along said edge of the stack in a working stroke of movement, conveyor means for causing said knife to pass along said stack adjacent said adhered edge thereof, said slicing knife having a blade formed with a guide portion and a cutting portion, and a guide member engageable by said guide portion of the knife for directing said knife into the stack at the proper level to separate the desired group of sheets.

12. In a machine for separating groups of sheets arranged in a stack and adhered along the edge which comprises means for supporting said stack in predetermined position, a traveling slicing knife, conveyor means for causing said knife to pass along said stack adjacent said adhered edge thereof, means forming a floating support for mounting said knife on said conveyor, fixed guide means for engaging a portion of said knife to control the proper position of said knife as it enters the stack, the body of said stack below the group of sheets separated by the knife serving as a continuation of the guide for maintaining the proper operating level of the knife.

13. A machine for separating groups of sheets in a stack which are adhered along an edge comprising a lift table adapted to receive said stack, means for sensing the level of the top of said stack including an upper limit and a lower limit, means controlled by said sensing means for actuating said lift table to maintain the top of said stack between said limits, a slicing knife, a control for causing the knife to perform a working stroke of operation through said adhering edge of the stack, and means for preventing said working stroke except when the top of said stack is at a predetermined level between said limits.

14. A machine for separating groups of sheets in a stack which are adhered along an edge comprising a lift table adapted to receive said stack, means for sensing the level of the top of said stack including an upper limit and a lower limit, means controlled by said sensing means for actuating said lift table to maintain the top of said stack between said limits, a slicing knife, a control for causing the knife to perform a working stroke of operation through said edge of the stack, means for preventing said working stroke except when the top of said stack is at a predetermined level between said limits, and means for adjusting said sensing means laterally of the stack in accordance with the length thereof.

15. A machine for separating groups of sheets which are adhered along an edge thereof and arranged in a stack which comprises a lift table adapted to receive said groups of sheets in a stack, means for sensing the level of the top of said stack, means for actuating said lift table under control of said sensing means to maintain the top of said stack at a predetermined level as each group of sheets is removed, an intermittently moving slicing knife, means for actuating said slicing knife for a stroke of movement to slice along said edge of the stack to separate the topmost group of sheets therefrom in a working stroke of movement, means for engaging the topmost group of sheets on the stack to effect removal thereof from the stack, means responsive to completion of said stroke of movement of said knife for operating said removing means intermittently in correlated relation with the working stroke of movement of said knife, and means for adjusting the relation between said removing means and the topmost group of sheets in accordance with variations in the thickness of said groups of sheets.

References Cited in the file of this patent

UNITED STATES PATENTS

| Number | Name | Date |
| --- | --- | --- |
| 1,174,739 | Langston | Mar. 7, 1916 |
| 1,246,592 | Harvey | Nov. 13, 1917 |
| 1,555,391 | Surfus | Sept. 29, 1925 |
| 2,298,451 | Palthasar | Oct. 13, 1942 |
| 2,469,052 | Rahe | May 3, 1949 |
| 2,565,207 | Demler | Aug. 21, 1951 |
| 2,584,346 | Harvely | Feb. 5, 1952 |

FOREIGN PATENTS

| Number | Country | Date |
| --- | --- | --- |
| 279,252 | Germany | May 18, 1912 |